Aug. 26, 1952     F. C. COOTWARE     2,608,360
COMBINED WHEELBARROW AND HOSE REEL
Filed Aug. 30, 1949     2 SHEETS—SHEET 1
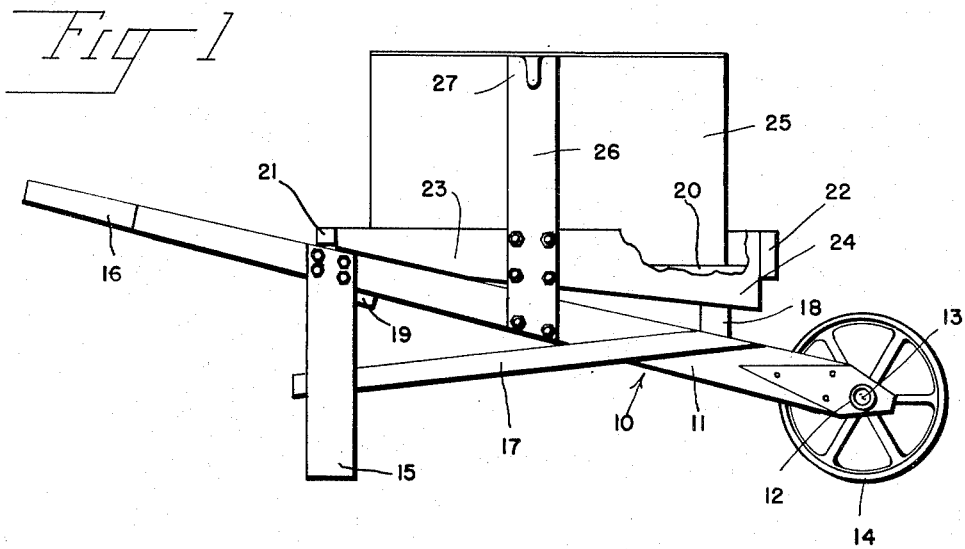
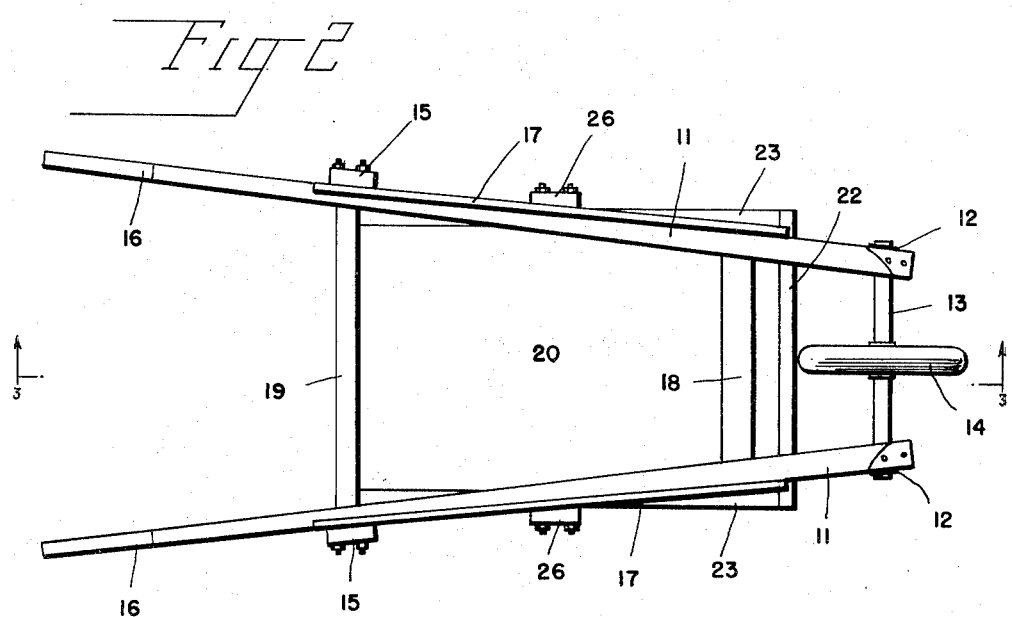
INVENTOR.
FRANK C. COOTWARE
BY
McMorrow, Berman & Davidson
ATTORNEYS

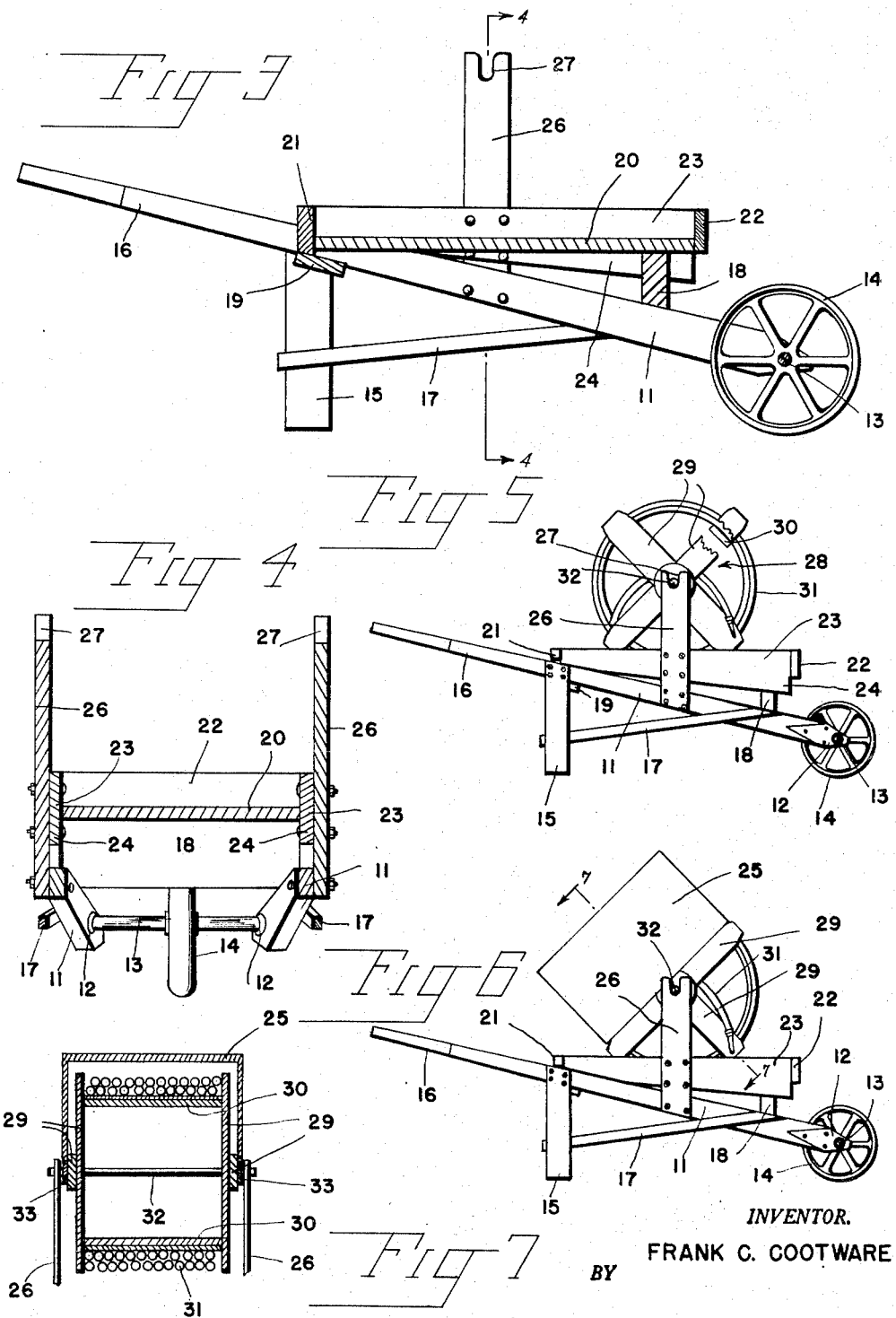

Patented Aug. 26, 1952

2,608,360

UNITED STATES PATENT OFFICE 2,608,360

COMBINED WHEELBARROW AND HOSE REEL

Frank C. Cootware, Mattoon, Wis.

Application August 30, 1949, Serial No. 113,097

1 Claim. (Cl. 242—87)

My invention relates to a combined wheelbarrow and hose reel.

A primary object of my invention is to provide a combined wheelbarrow and hose reel unit for use about the home and garden, the unit being highly simplified in construction, extremely sturdy and cheap to build.

A further object of the invention is to provide a wheelbarrow having a removable body or box, so that the same may be used for hauling a variety of materials.

A still further object of my invention is to provide a combination device of the above-mentioned class wherein a hose reel and wheelbarrow box or body are both readily removable, so that the device may be used for either purpose, and both the hose reel and wheelbarrow body may be mounted together upon the device for storage.

Other objects and advantages of the invention will be apparent during the course of the following description.

In the accompanying drawings, forming a part of this application, and in which like numerals are employed to designate like parts throughout the same, Figure 1 is a side elevation of a combined wheelbarrow and hose reel embodying my invention, Figure 2 is a bottom plan view of the same, Figure 3 is a central vertical longitudinal section taken on line 3—3 of Figure 2, Figure 4 is a vertical transverse section taken on line 4—4 of Figure 3, Figure 5 is a side elevation of the device and showing the same as used for a hose reel, Figure 6 is a similar view of the combined device with the parts arranged for storage, and Figure 7 is a diagonal section taken on line 7—7 of Figure 6.

In the drawings, where for the purpose of illustration is shown a preferred embodiment of my invention, the numeral 10 designates generally a wheelbarrow frame, including generally horizontal transversely spaced forwardly converging frame sides or bars 11, carrying bearings 12 at their forward ends, within which is journalled a transverse rotatable shaft 13 having secured thereto for rotation therewith a wheel 14, arranged at the longitudinal center of the shaft, as shown. Spaced rearwardly of the wheel 14 and near the longitudinal center, of the frame 10, are transversely oppositely arranged vertical legs 15, having their tops rigidly secured to the bars 11, as shown. The bars or frame sides 11 extend rearwardly of the legs 15 and form the usual wheelbarrow handles 16. Longitudinal inclined diagonal braces 17 are provided upon opposite sides of the wheelbarrow and the rear ends of these braces are rigidly secured to the legs 15 near their vertical centers, while their forward ends are rigidly secured to the bars 11 rearwardly of the wheel 14, as shown. A forward horizontal transverse beam 18 is rigidly mounted upon the bars 11 adjacent to the forward ends of the braces 17 and extends between the bars 11 for connecting the same. The top of the beam 18 is disposed at an elevation above the top of the wheel 14 and substantially in alignment with the tops of the legs 15, Figure 3. A rear transverse brace or bar 19 is rigidly secured to the lower sides of the bars 11 and extends between the legs 15. A horizontal rectangular base or platform 20 is provided and is rigidly mounted near its forward end upon the transverse beam 18. The rear end of the platform 20 is rigidly secured to an upstanding vertical end 21, rigidly secured to the transverse bar 19, as shown. The platform 20 has a forward transverse vertical end 22, rigidly secured thereto, and projecting above the platform for the same distance as the rear end 21. The platform also includes longitudinal sides 23, rigidly secured thereto and to the ends 21 and 22. The sides 23 are skirted, as shown, and extend below the platform 20 as shown at 24.

The construction thus far described forms a handy flat bottom wheelbarrow, useful for hauling long objects such as boards and pipe, as well as many other articles.

I provide a removable body or box 25 which may be formed of wood, sheet metal or the like. This box is open at its top and includes a flat bottom. The box is preferably rectangular and is adapted to be placed upon the platform 20, inwardly of the upstanding ends 21 and 22 and the sides 23. The ends and sides prevent the box from sliding off of the platform 20, in use. Obviously, with the box mounted upon the platform 20, the wheelbarrow is useful for hauling a variety of materials, such as sand, gravel, or the like.

Arranged upon opposite sides of the wheelbarrow and near the longitudinal center of the platform 20 are upstanding laterally oppositely arranged posts 26, rigidly secured to the sides 23 and bars 11, as shown. The posts 26 extend vertically above the platform 20 for a substantial distance, and are provided in their top ends with transversely aligned U-shaped openings 27. The posts 26 are adapted to removably support a hose rack or reel 28, including ends comprising crossed arms or bars 29, rigidly secured together, and arranged at right angles. The hose reel further comprises transverse horizontal bars or members 30, which are circumferentially spaced, and rigidly secured at their opposite ends to the crossed arms 29. These members 30 form the supports for a hose 31 which is windable upon the reel or rack 28. The crossed arms 29 carry a transverse rotatable axle 32, the outer ends of which extend outwardly of the crossed arms and are journalled within the U-shaped openings 27, as shown. Washers 33 may be provided between the posts 26 and crossed arms 29, if desired.

When the box or body 25 is removed, the hose reel 28 is mounted as shown in Figure 5 and the device serves as a portable hose reel.

When it is desired to store all elements of the combined device, the hose reel may be mounted as shown in Figure 5 and the body or box 25 inverted and placed over the top of the hose reel, Figure 6, the top edges of the inverted box engaging upon the crossed arms 29, which support the box.

It is to be understood that the form of my invention herewith shown and described is to be taken as a preferred example of the same, and that various changes in the shape, size and arrangements of parts may be resorted to, without departing from the spirit of my invention or the scope of the subjoined claim.

Having thus described my invention, I claim:

In a combined wheelbarrow and hose reel, a wheelbarrow frame including a pair of inclined frame bars arranged longitudinally of and converging toward one end of the frame, a ground wheel rotatably mounted between the convergent ends of said frame bars, a pair of substantially vertical, ground-engaging support legs secured at their upper ends to the respective frame bars intermediate the opposite ends of the frame bars, and a pair of brace bars extending transversely of and between the respective frame bars at locations spaced longitudinally of the frame bars; a flat, horizontal platform having connections at its ends to and supported upon said frame, said platform being elevated above the frame bars for a substantial part of its length and including vertical side and end walls extending upwardly from its several edges, the respective side walls of the platform being spaced vertically of the respective frame bars; a pair of vertical posts rigidly connected at their lower ends to the respective frame bars at locations on the frame bars disposed substantially medially between the brace bars, said posts having rigid connections intermediate their ends to the side walls of the platform, the posts providing means in cooperation with the platform effective to reinforce the frame transversely thereof at a location intermediate the brace bars, and having their upper ends projected above the platform, said upper ends of the posts having notches formed therein; and a hose reel carried by the posts, said reel including a reel axle having its ends removably and rotatably seated in the notches, pairs of crossed arms carried by the end portions of the axle, and connecting members extending between said pairs of crossed arms and spaced circumferentially about the axle to provide a drum portion on which a hose may be wound.

FRANK C. COOTWARE.

REFERENCES CITED

The following references are of record in the file of this patent:

UNITED STATES PATENTS

| Number | Name | Date |
| --- | --- | --- |
| 160,220 | Muller | Feb 23, 1875 |
| 345,775 | Fay | Dec. 21, 1886 |
| 1,342,437 | Gordon | June 8, 1920 |
| 1,559,646 | Roemer | Nov. 3, 1925 |
| 1,831,026 | Nessan | Nov. 10, 1931 |

FOREIGN PATENTS

| Number | Country | Date |
| --- | --- | --- |
| 76,027 | Switzerland | Mar. 16, 1918 |
| 610,640 | Germany | Mar. 14, 1935 |